E. H. GRAHAM.
Magazine Fire-Arm.
No. { 18. / 1,123. }
Reissued Jan. 8, 1861.
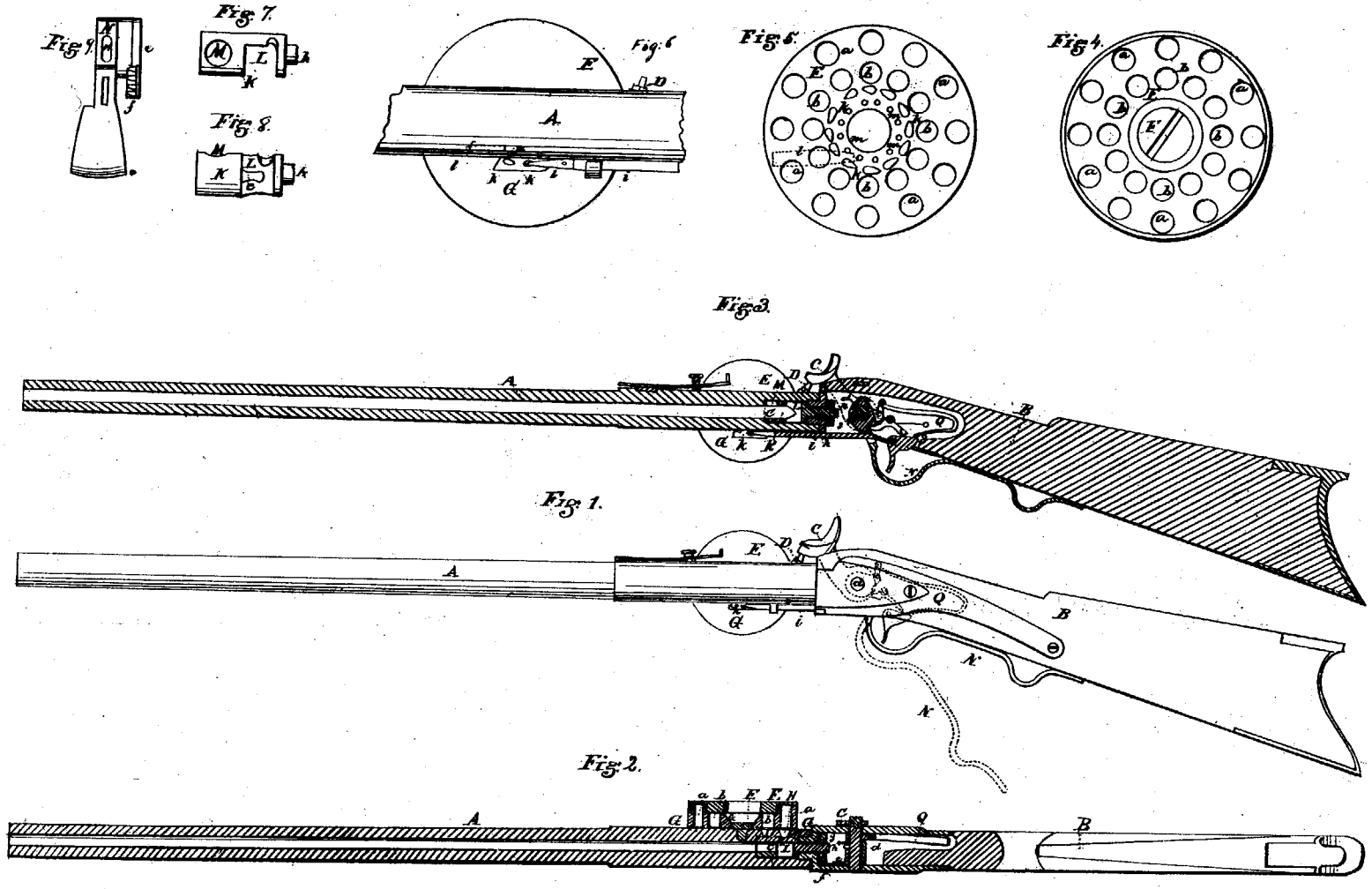
N. PETERS, PHOTO-LITHOGRAPHER, WASHINGTON, D. C.

UNITED STATES PATENT OFFICE.

EDMUND H. GRAHAM, OF BIDDEFORD, MAINE.

IMPROVEMENT IN MAGAZINE-GUNS.

Specification forming part of Letters Patent No. 10,084, dated October 4, 1853; Reissue No. 1,123, dated January 8, 1861.

*To all whom it may concern:*

Be it known that I, EDMUND H. GRAHAM, of Biddeford, in the county of York and State of Maine, have invented a new or Improved Magazine Gun or Fire-Arm; and I do hereby declare that the following is a full and clear description thereof, reference being had to the accompanying drawings, which form part of this specification, and in which—

Figure 1 indicates a side view of my improved fire-arm; Fig. 2, a horizontal and longitudinal section thereof; Fig. 3, a vertical and central section; Fig. 4, a side or front-side view of the rotary magazine with its covering-plate removed; Fig. 5, a rear-side view of the same; Fig. 6, a similar view thereof and that part of the gun to which it is or may be applied, and Figs. 7 and 8 side views of the rotary charge-receiver.

In said drawings, the part marked A indicates the barrel of the gun; B, the stock; C, the percussion hammer or cock, and D the percussion-cap nipple or cone, the latter being shown as arranged on the top or upper part of the barrel. The rotary magazine is seen at E. It is or may be arranged on the side of the barrel, be of circular shape, and made to rotate or turn on a screw-pin or journal, F, that may project from the barrel. Said magazine is provided with a series of cylindrical or other suitable cavities, *a a a*, &c., which may be disposed at equal distances apart and in a circle. These cavities are to contain the charges of powder. There is also shown as formed in the magazine a corresponding number of cavities, *b b* and *c*, which may likewise be arranged in a circle concentric to that of the powder-cavities *a a a*, &c. Each of these last-described cavities *b* is made of a depth sufficient to contain the ball or charge of shot for its corresponding powder-cavity. The magazine may rest against a circular plate, G, fastened or applied to the side of the gun-barrel. Through this plate and the barrel two passages, H I, are formed, so as to respectively communicate with a powder-cavity, *a*, and its corresponding ball-cavity *b* of the magazine, and receive the charges therefrom when the axes of the several passages or cavities are, say, vertical or at an inclination to the horizon, so as to cause the said charges to pass, by the force of gravity, from these cavities into the said passages.

Within the rear part of the barrel is a secondary short barrel or rotary charge-receiver, K, which is made cylindrical and to fit and turn within the main barrel. It has passages L M, which may be made through one side of it, and are adapted to receive the charges of powder and ball and convey them into its interior or bore *c*, that opens into and may be in line with the bore of the main barrel. Such charge-receiver turns or rotates transversely far enough to carry its receiving-passages entirely by the passages H I.

The movement of the charge receiver and conveyer K, which is or may be a reciprocating one, may be effected by mechanism connected with the trigger-guard N. Said guard N is shown as turning freely at its front end on the tumbler-axle *d* of the cock, and so as to enable the rear end of the guard to be moved from against the stock down into the position shown in Fig. 1 by dotted lines. An arm, *e*, projects from the front end of the guard, and has an arc, *f*, of cogs or teeth formed on one side of it, they being made to engage with a gear-wheel, *g*, fixed on the turning shaft or journal *h* of the rotary charge-receiver. Thus, by moving the trigger-guard, the motion of the charge-receiver is effected; also, when moving the trigger-guard away from the stock, the magazine is rotated and cock elevated.

The rotation of the magazine is or may be effected by a spring pawl or pitman, *i*, jointed to the trigger-guard at one end, and working at its other end with a series of depressions, *k k k*, formed in a circle in the rear side of the magazine. A spring retaining-pawl, *l*, attached to the plate G, works through the plate, and with a second set of depressions, *m m m*, formed in the rear side of the magazine. This latter pawl serves to hold the magazine in place at the termination of each movement of it effected by the impelling-pawl *i*.

The mode here shown of elevating the cock by means of the trigger-guard may be thus explained: The front part of the end or portion of the trigger-guard that turns on the tumbler-axle has a slot, *n*, made through it, as seen in Figs. 3 and 9, the latter being a front view of the upper end of the trigger-guard.

A stud or pin, *o*, is made to extend from the axle of the tumbler of the cock and through the said slot. When the trigger-guard is depressed or moved away from the stock, the lower end of the slot *n* is brought to bear against the pin *o*, and so as to elevate the cock during such downward movement of the trigger-guard. The cock being elevated high enough for the trigger to snap into the notch of the tumbler in the usual way, it will be held up by the trigger. In the return movement of the trigger-guard the slot *n* moves freely on the pin *o*. The upper part of the trigger, together with the mainspring Q and tumbler, are represented by dotted lines in Fig. 1.

Having now described sufficiently in detail how my invention may be constructed and applied, it may be needless to observe that numerous modifications may be made both in the construction, shape, and arrangement of the parts, as also in the employment of means for making automatic the actions of the magazine and charge-receiver, where an automatic action is preferred to a separate hand one, without departing from the novel feature or features of my improvement in its contrast with previous repeating and other fire-arms, some of which have employed a rotary magazine in connection with the gun-barrel, but not in connection with a separate revolving charge-receiver, while other guns have used a revolving charge receiver and conveyer within the barrel, but operating in connection with a stationary magazine arranged on the barrel or breech, and containing powder, ball, and priming.

From the description already given of my improvement it may be superfluous to explain at greater length the operation of the parts, as the latter are shown constructed and arranged in the accompanying drawings; but for better elucidation I shall here do so briefly.

By depressing the trigger-guard the charge-receiver and magazine are simultaneously rotated, the former far enough for reception of the charges of powder and ball or shot, and the latter so as to carry a load of such powder and ball or shot directly into line with the connecting-passages of the barrel. By turning the gun a little a load will pass from the magazine into the charge-receiver. This done, the trigger-guard is to be moved up to the stock, and while this takes place it rotates back the charge-receiver, so as to close the passages that convey the load through the side of the barrel and bring the nipple or cone passage into communication with the powder in the charge-receiver. On pulling the trigger a discharge of the gun will take place. This operation may be repeated while there are loads in the magazine.

And now having described fully my invention and how the same may be carried into practice, and the features which distinguish it from other magazine or repeating guns, I claim as new and useful—

1. The combination of a rotating magazine, separate rotating charge receiver or conveyer, and gun-barrel, for operation together substantially as herein specified.

2. Operating the rotating magazine and rotating charge-receiver automatically by the action of the trigger-guard or its equivalent.

3. The arrangement of the series of ball-chambers *b b b*, &c., and the series of powder-chambers *a a a*, &c., in concentric circles and on the side of the gun-barrel, and out of the sight-range, and so as not only to revolve and work against a common plate, E, affixed to the side of the gun, but to operate in conjunction with a rotary charge-receiver, K, placed within the barrel, as specified, such arrangement of the magazine of chambers not only causing the powder of the charges to be kept in separate chambers, so as to lessen the danger of accident, but causing the magazine to be so arranged as to be out of range of the sight in taking aim.

4. So to combine the percussion hammer or cock, rotary charge-receiver, and the rotary magazine with the trigger-guard that by the movement of the said guard away from the stock they may be simultaneously put in motion and the hammer brought up to full-cock, as specified.

EMD. H. GRAHAM.

Witnesses:

JOSEPH GAVETT,
D. W. BROWN.